Patented July 25, 1933

1,920,137

UNITED STATES PATENT OFFICE

HERMAN A. BRUSON, OF GERMANTOWN, PENNSYLVANIA, ASSIGNOR TO THE RESINOUS PRODUCTS & CHEMICAL CO. INC., OF PHILADELPHIA, PENNSYLVANIA

ALKOXYACETIC ACIDS

No Drawing.    Application filed September 28, 1932.  Serial No. 635,194.

This invention relates to new organic monocarboxylic acids containing an ether group and is a continuation of my co-pending patent application bearing Serial No. 588,499, filed January 23, 1932 pertaining to improved oil-soluble metal salts made from ethers of hydroxy acetic acid.

The acids to which the above application refers, have the general formula R-O-CH$_2$-COOH wherein R is an alkyl group having more than five carbon atoms. The present invention relates more specifically to acids of the formula R-O-CH$_2$-COOH wherein R is a branched chain alkyl group containing more than five carbon atoms.

These new acids may readily be obtained by condensing monochloracetic acid or an anhydrous metal salt thereof with an alkali metal salt of a branched-chain monohydric, aliphatic alcohol having more than five carbon atoms; it being understood that the term "branched-chain alcohols" as used herein also includes secondary alcohols. The condensation is preferably carried out by dissolving an alkali metal more especially sodium, (although potassium may be used) in an excess of the branched-chain monohydric aliphatic alcohol having more than five carbon atoms, so as to form the corresponding sodium alcoholate, and then causing the latter to react with monochloracetic acid or monobromacetic acid, or alkali metal salts thereof, under anhydrous conditions so as to split out sodium halide and form the alkali metal salt of the corresponding alkoxyacetic acid. The latter upon acidification liberates the free alkoxyacetic acid. These acids are in general, oils or low melting solids substantially insoluble in water. Their alkali metal salts are readily soluble in water and may be used as soaps. Their polyvalent metal soaps, or heavy metal soaps are soluble in organic solvents, notably in hydrocarbons and fatty oils.

In practicing this invention we have found it preferable to use an excess of sodium over that theoretically required to combine with the halogen and to replace the carboxyl hydrogen of the halogenated acetic acid used. In the case of alcohols whose sodium alcoholates are difficultly soluble in the excess of the alcohol used, an inert liquid such as xylene may be added so that the mass may be more readily stirred and the reaction controlled.

The alcohols preferably used are branched-chain octyl alcohols including capryl alcohol (octanol-2) although lower members notably sec-hexanol and certain alcohols boiling above 150° C., such as are present in the monohydric aliphatic alcohols obtained as a by-product in the catalytic synthesis of methanol from carbon monoxide (or dioxide) and hydrogen, may also be used. These latter alcohols are chiefly branched-chain, monohydric, primary and secondary alcohols having more than five carbon atoms as for example, di-isopropyl carbinol, 2-methylpentanol-1, 4-methylhexanol-1, 2,4-dimethylhexanol-1, 4-methylheptanol-1, 2,4-dimethylpentanol-1, 5-methylhexanol-3 and their higher homologues. The reaction may also be applied to tertiary alcohols having more than five carbon atoms. Other suitable alcohols are those having branched chains and more than five carbon atoms, made by heating one or more monohydric aliphatic alcohols with catalysts such as sodium or caustic soda at high temperatures and/or pressures, for example dicapryl alcohol, tricapryl alcohol, dihexyl alcohol, diamyl alcohol and the like.

Example 1

In a vessel equipped with a rapid agitator and reflux condenser, a mixture of 92 grams sodium (4 moles) and 780 grams of mixed monohydric aliphatic alcohols having a boiling range 157–196° C. such as is obtained as a by-product in the catalytic synthesis of methanol from carbon monoxide (or carbon dioxide) and hydrogen, is placed. This alcoholic mixture contains essentially mixed, branched-chain primary and secondary octanols and is a slightly yellowish liquid having a camphoraceous odor and sold commercially as "Higher alcohols from the methanol synthesis." The mixture is heated to about 140° C. with rapid stirring whereupon the sodium rapidly dissolves with evolution of hydrogen. When all is dissolved, the mixture is allowed to cool to room temperature and then treated with a solution of 95 grams monochloracetic acid in 150 grams of the same kind of alcohol as was used for dissolving the sodium. During this treatment, the alcoholic solution of chloracetic acid is added gradually with stirring during about 1 hour so that the temperature does not exceed 100° C. After addition of the chloracetic acid solution, the mixture is stirred for 5 hours at 135–140° C. It is then mixed with water and steam distilled to remove unchanged alcohols. The clear alkaline solution remaining in the still is then acidified to Congo Red indicator with dilute sulfuric acid whereupon the mixed alkoxyacetic acid material separates as a thin, brown oil. It is separated, washed with water and rectified in vacuo. The purified alkoxyacetic acid comes over as a very pale yellow to colorless oil, boiling at 142–153° C. under 8 m.m. of mercury and having an odor as of perspiration. It is only very slightly soluble in water.

Its sodium and potassium salts are readily soluble in water and give soapy solutions having detergent properties. An analysis of the lead salt showed about 34% lead indicating that the acid is a mixture containing essentially mixed octyloxyacetic acids. Its polyvalent metal salts are readily soluble in oils and hydrocarbons as described in copending application Serial No. 588,499. The yield of acid by the above method is 188 grams of distilled product which is practically a quantitative yield. By using 2 moles of sodium, the yield is about 75% of theory. Instead of chloracetic acid one may use monobromacetic acid.

*Example 2*

46 grams of sodium were dissolved in 400 grams of the mixed monohydric aliphatic alcohols from the catalytic synthesis of methanol, having a boiling range of 190–250° C. This material consists essentially of branched chain primary and secondary alcohols having more than 8 carbon atoms and forms a somewhat thick brown oil having a camphoraceous odor. The sodium alcoholate obtained is then treated with a solution of 90 grams monochloracetic acid dissolved in 150 grams of the same kind of alcohol as was used for dissolving the sodium, and the product worked up as set forth in Example 1. The alkoxyacetic acid mixture obtained distilled in vacuo at 169–190° C. under 5 m.m. pressure of mercury and formed a colorless oil which gradually solidified to a white mass of waxy crystals having a penetrating characteristic odor. The sodium and potassium salts of this acid are readily soluble in water and possess good detergent action. The polyvalent metal salts are soluble in benzene.

*Example 3*

92 grams sodium were melted under 300 grams xylene and treated with 580 grams of the mixed monohydric aliphatic alcohols boiling at 147–157° C. which are obtained as a by-product from the catalytic synthesis of methanol from hydrogen and carbon monoxide. This alcoholic mixture comprises primary and secondary branched chain alcohol higher than amyl. After the sodium has completely dissolved in the alcohol at 60–80° C., the solution is cooled to 40° C. and gradually treated with a solution of 190 grams chloracetic acid in 300 grams of the same alcohol, with rapid stirring, during which time the temperature goes to about 125° C. After heating 4 hours at 125–130° C. to complete the condensation, the product was diluted with water and distilled with steam to recover the xylene and alcohol. The alkoxyacetic acid mixture obtained upon acidification of the alkaline still residue formed a colorless oil boiling at 150–155° C. under 25 m.m. pressure. It appears to consist essentially of branched-chain hexyl- and heptyloxyacetic acids.

*Example 4*

Using a mixture of 285 grams xylene and 285 grams pure caphyl alcohol (octanol-2) in which 46 grams sodium has been dissolved at 100–110° C. and condensing with 95 grams monochloracetic acid (or 139 grams monobromacetic acid) dissolved in 200 grams warm xylene as set forth in Example 3 there is obtained, capryloxyacetic acid, having the formula,

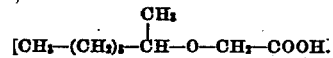

It forms a colorless oil boiling at 160° C. under 18 m.m. pressure. The yield is 70% of theory.

*Example 5*

2 atomic equivalents of sodium were dissolved in 5 moles of technical secondary hexyl alcohol boiling at 136–139° C. such as is obtained from the sulfuric acid wash of the hexene fraction of cracked petroleum. The sodium hexylate thereby obtained was treated with 95 grams monochloracetic acid (or 117 grams anhydrous sodium monochloracetate) added in small portions at a time so that the temperature did not exceed 100° C. The product was heated 3 hours at 110–130° C. to complete the condensation, the alcohol steam distilled off and the residue acidified. The crude sec-hexyloxyacetic acid was separated washed and distilled in vacuo. It boiled at 132–142° C. under 15 m.m. pressure.

*Example 6*

69 grams sodium were dissolved in 464 grams 2,4-dimethylpentanol-1 (boiling at

159–160° C.) as obtained by fractionation from the by-product alcohols of the catalytic synthesis of methanol from carbon monoxide and hydrogen, by stirring at 95–105° C. for about 8 hours. To the cooled solution at 44° C. there was added dropwise over a 5 hour period with constant stirring, a solution of 95 grams monochloracetic acid in 510 grams 2,4-dimethylpentanol-1, during which time the temperature went to 100° C. Then heated the mixture 5 hours at 120° C. to complete the condensation. The product was mixed with 500 ccm water and acidified to Congo Red indicator with dilute hydrochloric acid. The oily layer was removed, washed with water, and fractionated under reduced pressure. Recovered 450 grams of the alcohol and obtained 162 grams of product having the formula,

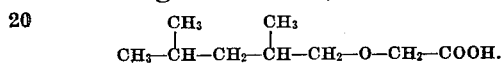

It is a colorless oil, insoluble in water boiling at 137° C. under 7 m.m. pressure. Yield 93% of theory.

It is understood that various methods may be employed both in the condensation process and in the isolation of the acids herein set forth. We, therefore, do not limit the process to any particular temperature or proportion of ingredients. The scope of the invention is to be determined only by the claims which follow.

What I claim is:

1. An acid having the formula R-O-CH₂-COOH wherein R is a branched-chain alkyl group containing more than five carbon atoms.

2. An acid having the formula R-O-CH₂-COOH wherein R is the alkyl group of a branched-chain primary aliphatic, monohydric alcohol having more than five carbon atoms.

3. An acid having the formula R-O-CH₂-COOH wherein R is the alkyl group of a secondary aliphatic, monohydric alcohol having more than five carbon atoms.

4. An acidic mixture composed of acids having the general formula R-O-CH₂-COOH wherein R is an alkyl radicle of a branched-chain, aliphatic, monohydric alcohol having more than five carbon atoms which is present in the mixture of by-product alcohols resulting from the catalytic synthesis of methanol from carbon monoxide and hydrogen.

5. An acidic mixture composed of acids having the general formula R-O-CH₂-COOH wherein R is an alkyl radicle of a branched-chain, aliphatic, monohydric alcohol having more than five carbon atoms and boiling substantially at 157–196° C. which alcohol is present in the mixture of by-product alcohols resulting from the catalytic synthesis of methanol from carbon monoxide and hydrogen, said acidic mixture boiling at about 142–153° C. under 8 m. m. of mercury pressure.

6. An acidic mixture composed of acids having the general formula R-O-CH₂-COOH wherein R is an alkyl radicle of a branched-chain, aliphatic, monohydric alcohol having more than five carbon atoms and boiling substantially at 190–250° C. which alcohol is present in the mixture of by-product alcohols resulting from the catalytic synthesis of methanol from carbon monoxide and hydrogen, said acidic mixture boiling at about 169–190° C. under 5 m.m. of mercury pressure.

7. Capryloxyacetic acid having the formula

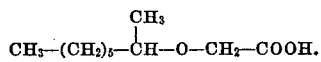

8. In the process of preparing an alkoxy-acetic acid, the step which comprises reacting upon an alkali metal alcoholate of a branched-chain, aliphatic, monohydric alcohol having more than five carbon atoms, with an acid of the type X-CH₂COOH wherein X is chlorine or bromine.

9. In the process of preparing an alkoxy-acetic acid, the step which comprises reacting upon at least two mole equivalents of an alkali metal alcoholate of a branched-chain, aliphatic monohydric alcohol having more than five carbon atoms, with not more than one mole equivalent of an acid of the type XCH₂-COOH wherein X is chlorine or bromine.

10. In the process of preparing an alkoxy-acetic acid the step which comprises reacting upon at least two mole equivalents of a sodium alcoholate of a branched-chain, aliphatic monohydric alcohol having more than five carbon atoms with not more than one mole equivalent of monochloracetic acid.

11. A process as set forth in claim 9 in which an inert solvent is present to assist in controlling the reaction.

12. An acid having the formula R-O-CH₂-COOH wherein R is a branched-chain octyl group.

HERMAN A. BRUSON.